United States Patent [19]

Beck et al.

[11] 4,401,147
[45] Aug. 30, 1983

[54] PORTABLE INSTRUMENT FOR MEASURING THE PERMEABILITY OF A PAPERMAKER'S FELT

[75] Inventors: David A. Beck, Appleton; Gary V. Schultz, Kimberly, both of Wis.

[73] Assignee: Appleton Mills, Appleton, Wis.

[21] Appl. No.: 306,170

[22] Filed: Sep. 28, 1981

[51] Int. Cl.³ ............... D21F 7/00; G01M 3/02; G01N 15/08
[52] U.S. Cl. .............................. 162/263; 73/38; 73/861.85
[58] Field of Search ............... 73/38, 861.77, 861.85, 73/861.88; 162/263, 254, 258, 198, 274

[56] References Cited

U.S. PATENT DOCUMENTS

| | | | |
|---|---|---|---|
| 1,550,124 | 8/1925 | Thompson | 73/861.77 |
| 2,723,562 | 11/1955 | Lutz et al. | 73/861.77 |
| 3,056,281 | 10/1962 | Smyth | 73/38 |
| 3,762,211 | 10/1973 | Poulsen | 73/38 |
| 3,808,876 | 5/1974 | Kershaw | 73/38 |
| 4,311,037 | 1/1982 | Gotchel et al. | 73/38 |

Primary Examiner—Steve Alvo
Attorney, Agent, or Firm—Andrus, Sceales, Starke & Sawall

[57] ABSTRACT

An instrument for measuring the air flow through a papermaker's felt at a location in registry with a vacuum box. The instrument includes a housing having a generally rectangular discharge outlet which is placed in contact with the felt in registry with the slot of a vacuum box. The housing includes an inlet chamber which houses an anemometer, and as the air is drawn into the inlet chamber by virtue of the vacuum created in the vacuum box, the air flow will rotate the anemometer vanes. A sensor produces an electrical signal in accordance with the speed of rotation of the anemometer and the signal generates, through suitable circuitry, a visual readout of the air flow. The device can be used to measure the permeability of the felt, as well as the air flow through the vacuum box.

8 Claims, 4 Drawing Figures

PORTABLE INSTRUMENT FOR MEASURING THE PERMEABILITY OF A PAPERMAKER'S FELT

In a typical papermaking process, the wet paper web is carried through the press section of the papermaking machine by a papermaker's felt. As the paper web and felt pass through the press rolls, water is extracted from the paper web into or through the felt. After extraction of water, the paper web passes through the dryer section of the machine, while the felt is passed over one or more vacuum boxes, which act to dewater the felt.

During use, the felt becomes more and more compacted, and also may tend to be clogged by foreign materials and thereby lose its permeability and its water extracting characteristics. In view of this, it is often desirable to be able to check the permeability of the felt to determine its operating characteristics.

It is also desirable to periodically measure the air flow created by the vacuum boxes to determine whether the vacuum boxes are operating at peak efficiency.

Various portable devices have been suggested in the past for measuring the permeability of papermaker's felt as it is used on the papermaking machine. Certain of these devices, such as disclosed in U.S. Pat. Nos. 3,808,876 and 3,056,281, incorporate a source of vacuum, such as a vacuum pump, in order to create air flow through the felt. While devices of this type can be used to determine the permeability of the felt they cannot be used to measure the air flow of the vacuum boxes.

Portable hot wire anemometers have also been used in the past to measure the air flow through the felt at the location of a vacuum box. With devices of this type, the air flow, created by the vacuum box, is directed across a heated wire and the rate of air flow is determined by the temperature drop in the wire produced by the cooling effect of the air flow. However, in the presence of water or moisture, the evaporative effect of the water will increase the cooling effect, and this can produce an erroneous reading of air flow.

SUMMARY OF THE INVENTION

The invention is directed to an improved device for measuring air flow through a papermaker's felt at a location in registry with a vacuum box. More specifically, the device includes a housing having a generally rectangular discharge opening which is engaged with the upper surface of the papermaker's felt at a location in alignment with the slot in the vacuum box.

The housing includes an inlet chamber having a generally horizontal axis, and a vane anemometer is mounted within the chamber. As air is drawn into the inlet chamber by the vacuum created in the vacuum box, the vanes of the anemometer will rotate, and a sensor is employed to measure the speed of rotation, which in turn, is converted into a visual readout of air flow that is shown as a display on the housing.

The instrument of the invention provides precise readings of air flow and is not affected by variations in ambient conditions. Thus, the instrument does not require calibration at the time of use due to atmospheric conditions.

The device is lightweight and portable and includes a self-contained electrical power source, such as batteries.

As a further advantage, the air discharge opening in the housing, which is placed in registry with the slot of the vacuum box, has a width sufficient to extend completely across the slot, so that placement of the instrument with respect to the vacuum box slot is not critical.

The instrument provides an immediate visual readout of air flow in standard units, such as for example, cubic feet per minute per linear inch of vacuum box, and as a feature, it is possible to hold or freeze the visual display at any given time.

As the air inlet chamber of the housing extends horizontally, the overall height of the instrument is reduced so that it can be used in areas of limited vertical access. Moreover, the sensing mechanism for sensing the speed of rotation of the anemometer is enclosed within the housing in a position where it will not be readily subjected to damage.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
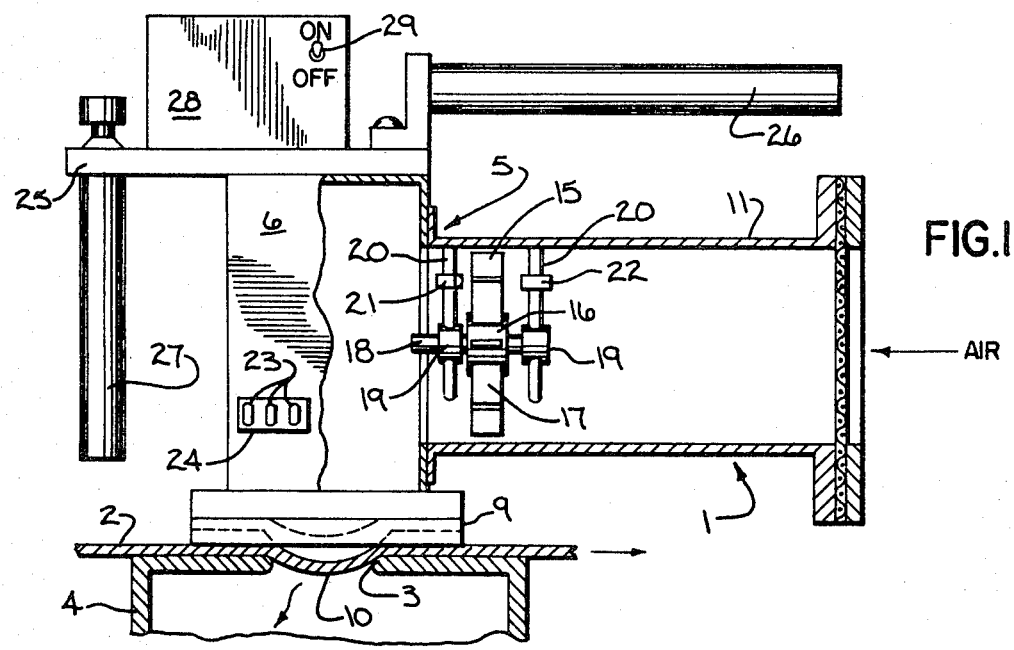
FIG. 1 is a side elevational view of the instrument of the invention as applied to a papermaker's felt with parts broken away in section.

FIG. 1 shows a device or instrument 1 for measuring the air flow of a papermaker's felt 2. As shown in FIG. 1, the instrument is placed in contact with the upper surface of the felt 2, in registry with the elongated slot 3 of a conventional vacuum box 4. The vacuum box 4 is connected to a vacuum pump or other source of subatmospheric pressure.

Figure 2:
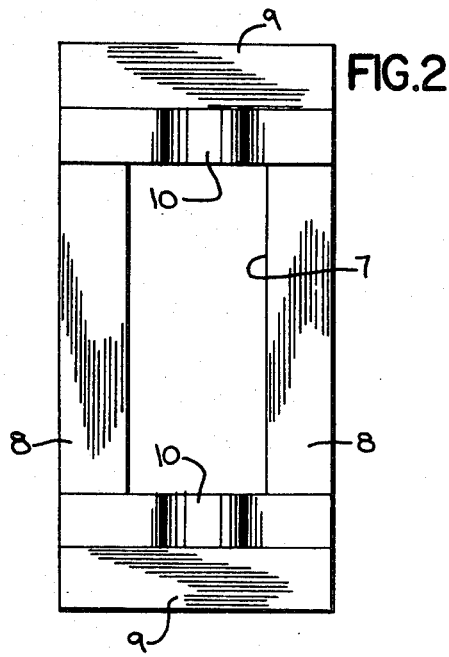
FIG. 2 is a bottom view of the instrument showing the air discharge opening which is to be aligned with the slot in the vacuum box.
Figure 3:
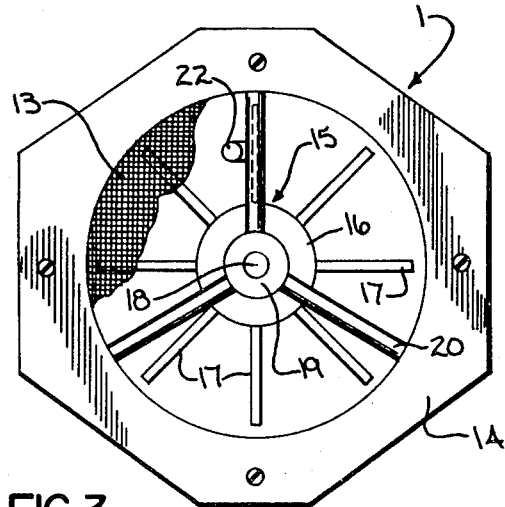
FIG. 3 is an end view of the instrument with parts broken away showing the anemometer.
Figure 4:
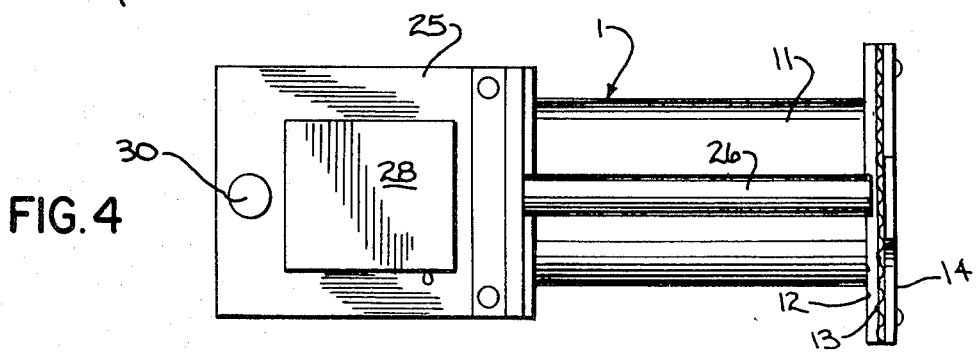
FIG. 4 is a top view of the instrument.

The instrument 1 includes a housing 5 which is composed of a generally rectangular section 6 having a lower opening 7 of rectangular configuration which is disposed in registry with the slot 3 of the vacuum box. As best shown in FIG. 2, the opening 7 is defined by a pair of side members 8, which extend longitudinally of the slot, and a pair of end members 9, which extend transversely of the slot. Flexible sealing strips 10 formed of resilient tubing or the like, can be mounted within recesses in end members 9 and when the instrument is positioned over the vacuum box 4, as shown in FIG. 1, the flexible strips 10 extend across the slot 3. As shown in FIG. 1, the felt 2 will tend to be drawn into the slot 3 by the vacuum created in the vacuum box and the strips 10 follow the depression in the felt to aid in sealing the housing to the felt.

Extending horizontally from the housing section 6 is a generally cylindrical section 11. The outer end of housing section 11 is formed with an outwardly extending flange 12, and a screen 13 is mounted between the flange 12 and an outer annular plate 14. The screen 13 prevents foreign material and water from entering the housing.

When the discharge opening 7 is placed in registry with the slot 3 of vacuum box 4, air will be drawn into the housing through the central inlet opening in the plate 14 and will be discharged through the opening 7 to the vacuum box 4. In accordance with the invention, an anemometer 15 is located within the housing section 11. The anemometer includes a central hub 16 and a series of vanes or blades 17 which extend radially outward from the hub. Hub 16 is mounted on a shaft 18 and the ends of the shaft are journalled within bearings 19, each of which is carried by a spider support 20. As best shown in FIG. 2, each spider support 20 includes three legs which are connected to the housing 11.

To measure the speed of rotation of the vanes 17, a light source 21 is mounted on one of the spider supports 20 and a photoelectric sensor 22 is mounted on the other spider support. The rotating blades will interupt the light beam from light source 21 to generate a series of electrical pulses in a known manner to provide an indication of the speed of rotation of the anemometer. Alternately, a generator can be operably connected to the shaft of the rotating vane assembly and the generator in turn generates a varying voltage, directly proportional to the speed of rotation of the anemometer. In either case the electrical signal can, in turn, be converted in a conventional manner to a digital readout of air flow in standard units, such as cfm/linear inch of vacuum box slot, which appears in the windows 23 of box 24 that is attached to the side of the housing section 6. Thus, the readout which appears in the windows 23 will provide the operator with an immediate indication of the air flow through the opening 7 to the vacuum box.

This rate of air flow can be used to determine the relative porosity of the papermaker's felt or alternately, the reading can be used to determine the magnitude of the vacuum created by the vacuum box.

The instrument is portable and in this regard, a frame 25 is mounted to the housing 5 and a pair of handles 26 and 27 are connected to the frame. The handle 26 extend horizontally above the section 11, while the handle 27 extends downwardly along the housing section 6.

Mounted on the frame 25 is a box or casing 28 containing electrical batteries which operate the electrical sensing system. An on-off switch 29 is located in the casing 28. Alternately, the batteries can be contained within the handle or in any other desired location in the instrument.

A provision is made to hold or freeze the digital display of air flow which is shown in the window 23, and in this regard a button 30 is mounted on the upper end of the handle 27. By depressing the button, the digital display will be held or frozen.

The instrument of the invention provides a precise measurement of air flow through the felt which is not effected by atmospheric conditions. The air flow measurement can be used to determine the relative porosity of the felt, or alternately to determine the air flow characteristics of the vacuum box.

The instrument is lightweight and portable and includes a self-contained electrical power source.

The opening 7 is designed with a width so that it will completely straddle the slot 3 of the vacuum box 4 so that placement of the instrument with respect to the slot 3 is not critical. The optional flexible strips 10 will accommodate the depression in the felt, as it travels over the slot 3, to minimize air leakage.

Various modes of carrying out the invention are contemplated as being within the scope of the following claims particularly pointing out and distinctly claiming the subject matter which is regarded as the invention.

I claim:

1. A papermaking apparatus, comprising in combination a vacuum box defining an internal chamber connected to a source of vacuum, said vacuum box having an opening communicating with said chamber; a porous web supported for travel on said vacuum box and disposed over said opening; and a portable air flow measuring apparatus for measuring air flow through said web, said measuring apparatus comprising a housing defining an internal chamber, said housing having an inlet opening through which air is introduced into said housing and having a discharge opening disposed in alignment with the opening in said vacuum box, air being drawn into said housing by the vacuum in said vacuum box and said air flowing through said discharge opening into said vacuum box, an anemometer disposed within the housing and including a plurality of blades disposed to be rotated by air flowing through said housing from the inlet to the outlet, measuring means for measuring the speed of rotation of said blades, means for converting said speed of rotation to a rate of air flow, a self-contained power source carried by the housing and operably connected to said measuring means for operating said measuring means, and means located on the housing for visually displaying said air flow rate.

2. The instrument of claim 1, wherein said discharge opening is generally rectangular in shape and includes a pair of ends and a pair of sides, and a flexible sealing member disposed along each end of the opening and projecting outwardly from said housing, said sealing member adapted to conform to the configuration of the felt as the felt moves across said vacuum box.

3. The instrument of claim 1, wherein said housing includes a first housing section and a second housing section disposed generally normal to said first section, said discharge opening being disposed in said first housing section and said inlet opening being located in said second housing section, said anemometer being disposed in said second housing section in alignment with said inlet opening.

4. The instrument of claim 3, wherein said second housing section is generally cylindrical in shape and said anemometer is located a substantial distance from the inlet opening.

5. The instrument of claim 1, and including a screen disposed across the inlet opening.

6. The instrument of claim 1, wherein said discharge opening is generally rectangular in shape and is defined by a pair of side edges and a pair of end edges, and a flexible curved sealing member secured along each end edge and projecting downwardly from said housing, said sealing members adapted to conform to the contour of the felt when the felt is depressed as it passes across said vacuum box.

7. The instrument of claim 1, and including a handle connected to the housing to manually support the instrument.

8. A portable instrument for measuring flow through a papermaker's felt disposed in alignment with the vacuum box, comprising a housing defining an internal chamber, said housing having an inlet opening through which air is introduced into said chamber and having a discharge opening disposed in alignment with said vacuum box and through which air is discharged into said vacuum box, said housing including a first housing section and a second housing section disposed generally normal to said first section, said discharge opening being disposed in said first housing section and said inlet opening being located in said second housing section, an anemometer disposed within the second housing section in alignment with said inlet opening and including a plurality of blades, a screen disposed across the inlet opening, air flowing through said chamber causing said blades to rotate, measuring means disposed within the housing for measuring the speed of rotation of said blades, means for converting the measurement of speed of rotation to a rate of air flow, a self-contained power source carried by the housing and operably connected to said measuring means for operating said measuring means, means located on the housing for visually displaying the rate of air flow, said discharge opening being generally rectangular in shape and being defined by a pair of side edges and a pair of end edges, and a flexible curved sealing member secured along each end edge and projecting downwardly from said housing, said sealing members adapted to conform to the contour of the felt when the felt is depressed as it passes across said vacuum box.

* * * * *